US012597695B2

(12) United States Patent
Aliakbariabar et al.

(10) Patent No.: US 12,597,695 B2
(45) Date of Patent: Apr. 7, 2026

(54) ANTENNA FOR A GLASS ROOF OF A VEHICLE

(71) Applicant: Volvo Car Corporation, Gothenburg (SE)

(72) Inventors: Hanieh Aliakbariabar, Gothenburg (SE); Christian Lötbäck, Gothenburg (SE); Xiaotian Li, Gothenburg (SE); Buon Kiong Lau, Gothenburg (SE)

(73) Assignee: Volvo Car Corporation, Gothenburg (SE)

(*) Notice: Subject to any disclaimer, the term of this patent is extended or adjusted under 35 U.S.C. 154(b) by 57 days.

(21) Appl. No.: 18/632,912

(22) Filed: Apr. 11, 2024

(65) Prior Publication Data

US 2024/0396202 A1 Nov. 28, 2024

(30) Foreign Application Priority Data

May 22, 2023 (EP) .................................... 23174664

(51) Int. Cl.
*H01Q 1/12* (2006.01)
*H01Q 1/24* (2006.01)

(52) U.S. Cl.
CPC ............. *H01Q 1/1271* (2013.01); *H01Q 1/24* (2013.01)

(58) Field of Classification Search
CPC ...... H01Q 1/1271; H01Q 1/24; H01Q 1/3275; H01Q 1/325
See application file for complete search history.

(56) References Cited

U.S. PATENT DOCUMENTS

| | | | | |
|---|---|---|---|---|
| 5,128,685 | A * | 7/1992 | Shinnai | H01Q 1/3275 343/713 |
| 11,569,580 | B2 * | 1/2023 | Dai | H01Q 1/325 |
| 2005/0195114 | A1 * | 9/2005 | Yegin | H01Q 1/325 343/713 |
| 2006/0090405 | A1 * | 5/2006 | Sablatzky | B60R 13/04 52/110 |
| 2017/0237148 | A1 * | 8/2017 | Patel | H01Q 1/3275 343/713 |
| 2017/0324141 | A1 * | 11/2017 | Talty | H01Q 1/3291 |
| 2018/0037006 | A1 * | 2/2018 | Droste | H01Q 9/0407 |
| 2023/0068756 | A1 * | 3/2023 | Carper | H01Q 9/0428 |

OTHER PUBLICATIONS

Extended European Search Report received for European Application Serial. No. 23174664.5 dated Nov. 14, 2023, 11 pages.
Sze, et al. "Design of Broadband Circularly Polarized Square Slot Antenna With a Compact Size" Progress In Electromagnetics Research, vol. 120, 513-533, 2011, 21 pages.

(Continued)

*Primary Examiner* — Hai V Tran

(74) *Attorney, Agent, or Firm* — Amin, Turocy & Watson, LLP

(57) ABSTRACT

The disclosure relates to an antenna for a glass roof of a vehicle. The antenna can comprise a radiator for radiating electromagnetic waves. The radiator can be configured to be disposed between two glass layers of the glass roof. The radiator can be configured for feeding a signal to a receiver. The antenna can be substantially flat.

20 Claims, 5 Drawing Sheets

(56) References Cited

OTHER PUBLICATIONS

Han, et al. "Compact broadband circularly polarized slot antenna with artificial magnetic conductor reflector" Int J RF Microw Comput Aided Eng. 2022, 7 pages.
Gharaati, et al. "Transparent Wideband Circularly Polarized GNSS Antenna for Vehicular Applications" IEEE Access, vol. 9, 2021, 14 pages.
Liu, et al. "A Low-Profile Dual-Band Dual-Polarized Antenna With an AMC Reflector for SG Communications" IEEE Access, vol. 8, 2020, 9 pages.

* cited by examiner

ANTENNA FOR A GLASS ROOF OF A VEHICLE

CROSS-REFERENCE TO RELATED APPLICATIONS

This application claims the benefit of and priority to pending EP patent application Ser. No. 23174664.5, filed May 22, 2023, and entitled "ANTENNA FOR A GLASS ROOF OF A VEHICLE," the entirety of which is hereby incorporated by reference herein.

TECHNICAL FIELD

The present disclosure relates to vehicles and, more particularly, to an antenna for a glass roof of a vehicle.

BACKGROUND

In recent years, modern wireless technologies have found important applications in the vehicular context. Different wireless services, such as AM/FM radio, Digital Audio Broadcasting (DAB), Global Navigation Satellite System (GNSS), Remote Keyless Entry (RKE), tire pressure monitoring system (TPMS), Electronic Toll Collection (ETC), Long Term Evolution (LTE), Bluetooth, Wi-Fi, and V2X communication, have been introduced to provide infotainment, access control, communication, positioning, and safety functionalities.

In each of these services, one or more antennas are needed to transmit and/or receive the signals in the wireless system. Therefore, as the number of wireless services increases, the number of antennas that are fitted in the vehicles has also considerably increased. The antennas for some of the most important services are commonly integrated in a protruding antenna module called a "shark-fin". However, the shark-fin modules should not grow in size to accommodate more antennas, as they influence the vehicle aerodynamics and disturb their aesthetic appearance, the latter aspect being a major selling point for passenger cars.

SUMMARY

The present disclosure relates to an antenna for a glass roof of a vehicle, an antenna system, and a glass roof.

The above problem is at least partially solved or alleviated by the subject matter of the independent claims of the present disclosure, wherein further examples are incorporated in the dependent claims.

According to a first aspect of this disclosure, there is provided an antenna for a glass roof of a vehicle. The antenna may be substantially flat. The antenna may comprise a radiator for radiating electromagnetic waves. The radiator may be configured to be disposed between two glass layers of the glass roof. The radiator may be configured for feeding a signal to a receiver.

By integrating the antenna at least with its radiator into the glass roof of a vehicle, the antenna according to the first aspect of this disclosure makes use of the opportunities that more glass is introduced in modern vehicles and more antennas as well as more types of antennas are integrated in vehicles.

The provided antenna may conform to the vehicle body and may be considered an alternative to hidden antennas in shark-fin modules. In particular, a soft visual impact may be achieved by implementing an at least optically transparent antenna, where at least the radiator and/or other parts of the antenna may be provided with at least partially optically transparent characteristics, as will be explained in more detail later. This enables a particularly seamless antenna integration into the glass roof of the vehicle, where passengers inside of the vehicle may still recognize the antenna by looking closely at the glass roof but the overall optically transparent design of the glass roof is not disturbed even if the antenna is positioned in a transparent and/or central portion of the glass roof consisting of glass.

The particular interest of the provided antenna for vehicle integration is the vehicle roof, which is currently undergoing significant changes in terms of material. Traditionally, vehicle roofs are made from metal and are opaque. However, there is an increasing trend of glass roofs. The antennas currently located in the roof area are designed to work well with the metal roof. As such, the performance is often degraded when the metal is replaced with glass. What seems to be a problem is used as an opportunity by the antenna according to the first aspect of the invention by exploiting the structural and electrical properties of the glass roof for antenna integration.

For example, the antenna is provided as a substantially flat antenna, which means that its components, at least its radiator and possibly further components, such as the later mentioned reflector, may have a much greater extension in length and width than in thickness, e.g., a factor of at least 1:10, particularly at least 1:50 or at least 1:100, thickness to length and/or width. Also, the radiator of the antenna is disposed or sandwiched in between two glass layers of the glass roof, which is convenient for the flat design and gives protection to the antenna. Additional housing and thereby costly components with additional weight are not required. Further, the radiator is configured for feeding a signal to a receiver of a corresponding antenna system. The radiator may comprise a corresponding feed portion, such as a feedline, for feeding the signal to the receiver. This feed portion may be included in between the two glass layers. Further examples of the antenna, such as for the antenna design exploiting the structural and electrical properties of the glass roof, are given below.

The antenna may be configured as a global navigation satellite system (GNSS) antenna. In particular, the antenna may be configured as a high-precision global navigation satellite system (HP-GNSS) antenna. HP-GNSS is a newly introduced positioning system, which is used by the vehicle industry to support autonomous drive applications. The antennas used for HP-GNSS typically have relatively large profiles (i.e., thick in its form factor) and are costly, to fulfill high performance requirements. Their bulky profile leads to significant challenges when packaging the current antenna into relatively small vehicles in particular. They are also non-transparent but should have an unobstructed view of the sky. Providing the antenna as described herein with HP-GNSS is therefore particularly advantageous as the disadvantages associated with these may be eliminated at least partially.

The radiator may be configured for radiating electromagnetic waves, in particular circularly polarized electromagnetic waves, in particular in at least two or at least three frequency bands of GNSS. These frequency bands may be at least L5, L2, and L1 frequency bands of GNSS. The L1 frequency band may comprise 1559-1606 MHZ, the L2 frequency band may comprise 1197-1249 MHZ, and the L5 frequency band may comprise 1160-1190 MHz. Given the proximity of the frequency bands of L2 and L5 to each other, the radiator may be designed as a dual-band radiator.

The radiator may be configured for electromagnetic coupling and/or for physical connection at an edge region of the glass roof. Accordingly, the feed portion mentioned above, such as the feedline, may be configured for the electromagnetic coupling. An electromagnetic connector may be located opposite of the feed portion and may be attached, e.g., glued, to the glass roof, for example. Accordingly, or additionally, a wired connection, which requires additional wires running along the glass roof, possibly through the roof glass of the glass roof, may be omitted and a particularly seamless design may be achieved. Also, a particularly stable and reliable connection may be achieved by the electromagnetic coupling. In the alternative, or additionally, a physical connection, e.g., by means of a wire, may be provided. This wire may run from the radiator and in between the two glass layers to an edge region of the glass roof, which may have a rim or bezel of the roof glass of the glass roof. In such an edge region, where the rim or bezel may not be made from glass or the roof glass may not be transparent or less transparent, the wire may be connected to the receiver without negatively affecting the glass roof design, e.g., obstructing the view of the passengers inside of the vehicle through the glass roof.

The radiator may comprise an outer segment, the outer segment comprising a feed portion configured for feeding a signal to a receiver. Additionally, or alternatively, the radiator may comprise an inner segment. The inner segment may comprise at least one of the following structures: a T-shaped structure, an asymmetrically shaped structure, and a loop structure. Furthermore, the feed portion may be connected to the asymmetrically shaped structure. The asymmetrically shaped structure may be an L-shaped structure, for example. The feed portion may be an I-shaped or strip-shaped structure. In particular, the feed portion and the asymmetrically shaped structure may be made as one single structure. The feed portion or feed structure may be protruding or running inside of one side or edge of the outer segment, in particular inside of a slot extending in one side or edge of the outer segment. The outer segment may be designed as a rim segment, in particular a rectangularly shaped rim segment. The slot may be extending into the outer segment, but not run entirely through it, i.e., not separating the outer segment. The loop structure may be a rectangular structure. The loop structure may be positioned adjacent to the asymmetrically shaped structure. The T-shaped structure may extend from a side or edge of the outer segment adjacent to the slotted side or edge of the outer segment towards the inner segment. Between the asymmetrically shaped-structure and the feed portion or structure, additional cut-outs or width-increased slots may be provided for at least a certain length of the feed portion inside of the outer segment and between the asymmetrically shaped-structure and the feed portion.

The design features of the segments, portions, and/or structures of the radiator serve certain functions of the antenna. For the desired circular polarization of the radiator, two orthogonal modes in the structure of the radiator with 90 degree of phase shifts in the entire frequency band are desired. In the outer segment of the radiator structure, two degenerate broadside modes are associated with two side lengths of both the inner and outer segments. By application of the theory of characteristic modes it was found that by cutting or slotting one side or edge and adding the feed portion inside of the thereby created slot, the two degenerated modes will be separated in frequency. By adding the asymmetrical structure to the feed portion or structure, one more mode can be added to the higher frequency band. Thus, these three modes will help to create circular polarization along the entire band. The circular polarization in higher frequencies can be mainly tuned by the asymmetrically shaped structure. Similarly, the circular polarization in lower frequency band can be tuned by the loop structure. The T-shaped structure may be added for improving impedance and circular polarizations' band's overlap. The additional cut-outs or increased width slots between the asymmetrically shaped structure and the feed portion may be added for improving the matching in the entire band.

The antenna may further comprise a reflector for reflecting electromagnetic waves from the radiator. The reflector may improve the performance of the antenna. The reflector may in particular be configured for reflecting electromagnetic waves with close to zero phase shift for the frequency bands of the radiator. By means of the reflector, the backlobe of the antenna may be reduced, the antenna gain is increased, the phase center stability is increased and multipath propagation protection is provided. The reflector may in particular be designed as a dual band reflector, in particular with the frequency bands described above, e.g., L2+L5 and L1.

The reflector may be configured to be provided at a distance from the radiator. The distance may be corresponding to at least the thickness of an interior glass layer of the two glass layers disposed between the radiator and the reflector. This increases the performance of the antenna by means of the reflector and enables a simple and cost-effective design of the antenna. In particular, the distance affects the mutual coupling between the reflector and the radiator. As mutual coupling increases, there will be more ripples in the results. The distance may be corresponding at least to the thickness of the interior glass layer, meaning the glass layer positioned towards or inside of the vehicle, or more, as will be explained below. Interior glass layer refers to the glass layer interior with respect to the cabin of the vehicle, while exterior glass layer refers to the glass layer exterior with respect to the cabin, i.e., on the outside of the vehicle.

The distance between the radiator and reflector may be further increased by an additional layer in between the radiator and reflector. The additional layer may comprise air and/or low permittivity substrate (e.g., acrylic substrate). The additional layer may also be at least partially or substantially optically transparent. This additional layer mitigates the high mutual coupling between the radiator and the reflector, which can result in ripples in the final radiation and impedance results.

The reflector may be configured to be provided in or at an interior coating layer of the glass roof. The reflector may therefore make use of already present structures of the glass roof or, alternatively, be provided as a separate structure, for example as a sticker attached to the interior glass layer. The interior coating layer may be a functional layer of the glass roof. Such a functional layer may serve one or more functions of the glass roof, e.g., UV protection, dimming, changing colors etc. The interior coating layer, in particular functional layer, may be a conductive interior coating layer and/or electrochemical interior coating layer, for example. The interior coating layer may be located at or under the interior glass layer of the glass roof.

The reflector may comprise a first reflector layer and a second reflector layer arranged substantially in parallel to each other and at a distance from each other. The first reflector layer and the second reflector layer may be distanced from each other by another layer, which may be the mentioned interior coating layer of the glass roof or another interior layer of the glass roof, such as the mentioned sticker.

This means that the first reflector layer may be attached closer to the interior glass layer, e.g., directly attached to the interior glass layer and/or an exterior side of the interior coating layer or other interior layer facing the interior glass layer. The second reflector layer may be attached to the interior side of the interior coating layer or other interior layer, facing away from the interior glass layer, and attached with its exterior side to the interior glass layer. Accordingly, the interior coating layer or the other interior layer on which the reflector may be provided may also serve as a layer distancing the two reflector layers from one another, thereby enabling a particularly flat or thin design, and not requiring any further and costly material.

The first reflector layer may be configured as a periodic structure. The second reflector layer may be configured as a ground plate. The periodic structure may be provided, e.g., printed, on or as the interior coating layer, for example. The ground plate may also provide reflective properties and serve with its reflective properties as an isolator towards the passenger cabin, substantially preventing waves from entering the cabin through the reflector.

The reflector, in particular the first reflector layer, may have periodically repeated rectangular structures. These rectangular structures may represent unit cells of the first reflector layer. Each of the rectangular structures may comprise slots dividing the rectangular structure into four interconnected sub-rectangular structures inside of each rectangular structure. The reflector, in particular the first reflector layer, may also have an outer or rim segment and an inner segment, which may be separated from one another by a circumferential, in particular rectangular, gap. The inner segment may comprise the periodically repeated rectangular structures. The outer or rim segment may be designed as an outer square ring.

The design features of the segments, portions and/or structures of the reflector, in particular the first reflector layer, serve certain functions of the antenna. The outer segment resonates at the lower frequency band(s) of the reflector and the sub-rectangular structures, which may be etched with the four rectangular slots into the reflector, in particular first reflector layer, resonates at the higher frequency band(s). As the lower and higher frequency bands may be very close to each other (small frequency ratio of the center frequency of the lower band to that of the higher band), the four slots are increasing the electrical length of the inner portion to achieve such small frequency ratio.

The radiator and/or the reflector may be at least partially optically transparent. Also, other components or layers in the configuration of the antenna in the glass roof may be at least partially optically transparent, such as the herein mentioned additional layer, the interior coating layer and/or the substrate layer.

The radiator and/or the reflector may comprise a conductive thin film and/or a conductive mesh. The conductive mesh and/or conductive thin film may comprise or be made from metal, for example.

The radiator and/or the reflector may be provided on a substrate layer. The substrate layer may be at least partially optically transparent. The radiator and/or the reflector may be in particular printed on the substrate layer. The radiator may be disposed together with the substrate layer in between the two glass layers. The substrate layer may be made from or comprise PET, for example. Also, in between the two glass layers, an additional material layer may be disposed, in between which the radiator with or without the substrate layer may be inserted. This additional material layer may be made from or comprise PVB, for example.

According to a second aspect, there is provided an antenna system comprising the antenna according to the first aspect of this invention and a receiver configured to be coupled to the antenna for receiving a signal from the radiator of the antenna.

In particular, the receiver may be coupled by means of a physical connection and/or an electromagnetic connector to the radiator of the antenna, in particular its feed portion, as described above. Any signaling component, such as an amplifier, may be positioned between the antenna and the receiver.

According to a third aspect of this disclosure, there is provided a glass roof of a vehicle, the glass roof comprising the antenna according to the first aspect of this disclosure or the antenna system according to the second aspect of this disclosure, the radiator of the antenna being disposed between two glass layers of the glass roof.

It is noted that the above aspects, examples, and features may be combined with each other irrespective of the aspect involved.

The above and other aspects of the present disclosure will become apparent from and elucidated with reference to the examples described hereinafter.

BRIEF DESCRIPTION OF DRAWINGS

Examples of the disclosure will be described in the following with reference to the following drawings.

DETAILED DESCRIPTION

The figures are merely schematic representations and serve only to illustrate examples of the disclosure. Identical or equivalent elements are in principle provided with the same reference signs.

Figure 1:
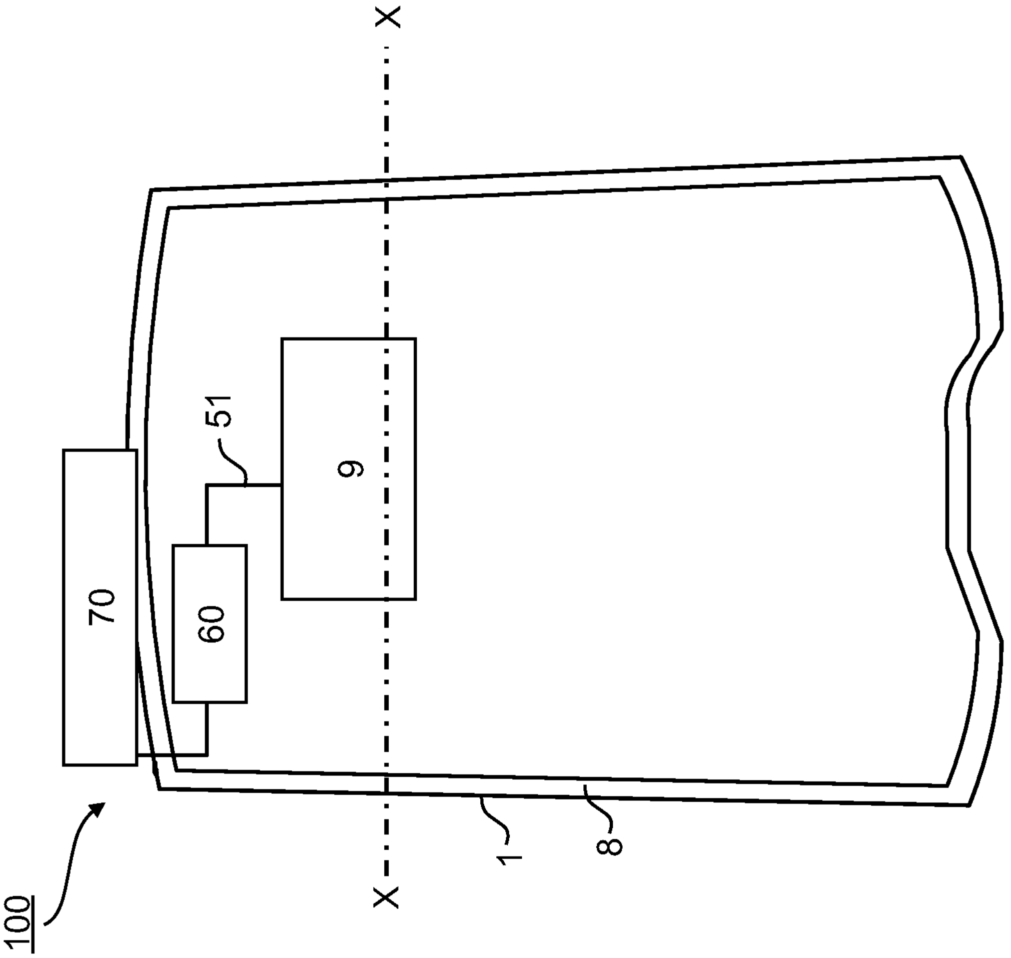
FIG. 1 shows a view on a glass roof of a vehicle comprising an antenna and of an antenna system.

FIG. 1 illustrates a glass roof 1 of or, in other words, for a vehicle (not depicted), such as a passenger car, for example. The glass roof 1 is at least partially or substantially optically transparent, which means that at least some or most light may enter the vehicle cabin through the glass roof 1. The glass roof 1 may comprise a roof glass, which is the glass part of the glass roof 1, and further components, such as a frame, for example. In the example of FIG. 1, the glass roof 1 is shown only with its roof glass and no further components. Further, in the example of FIG. 1, the glass roof 1 has an edge region 8, where such frame may be located and/or the glass roof 1 may be darkened or obscured, for example.

The glass roof 1 further comprises an antenna 9, which is attached and/or embedded into the glass roof 1. The antenna 9 may be at least partially or substantially optically transparent. The antenna 9 is part of an antenna system 100, which also comprises a receiver 70 and an amplifier 60. The amplifier 60 may be a low noise amplifier. The amplifier 60 is merely shown schematically at the glass roof 1, but may as well be located outside thereof. The receiver 70 connects via the amplifier to the antenna 9 by means of a wired connection 51, in this example.

Contrary to FIG. 1, a wired connection 51 may be at least partially or for the most part arranged in the edge region 8 such that it does not obscure the view from the vehicle cabin through the glass roof 1. Also, a wireless connection may be used alternatively, where a wireless connector may be coupled to the antenna 9, in particular in the form of an electromagnetic connector 50 (see FIG. 2).

The antenna system 100 may in particular be configured as an GNSS (global navigation satellite system) or HP-GNSS (high precision global navigation satellite system) antenna system. The position estimation in such an antenna system 100 starts with reception of a satellite signal through the antenna 9 mounted on the vehicle roof, which is connected to the amplifier 60 and receiver 70.

The antenna 10 may be a wide band CPW-fed square slot antenna. It may cover at least GNSS L5 (1160-1190 MHZ), L2 (1197-1249 MHZ) and L1 (1559-1606 MHZ) and the frequency band between L5 and L2 bands, as well as that between L2 and L1 bands with one single feed, in particular feed portion 13 (see FIG. 5). It does in particular not need any additional external circuit (i.e., phase shifter, power divider, matching elements, etc.) for the purpose of matching or circular polarization operation.

The antenna 9 uses circularly polarized radiation operation, at least in two frequency bands but preferably at three frequency bands for higher positioning accuracy. The placement of the antenna 9 on the vehicle is important for the reliability and accuracy of position estimates. In particular, the antenna 9 should be skyward pointing to receive GNSS signals from satellites and not be obstructed by any part of the vehicle.

Therefore, the antenna 9 is expected to provide the best performance when mounted at the topmost part of a vehicle (i.e., roof) as compared to any other position in/on the vehicle. For the visual appearance, it is preferred here that the antenna 9 is substantially planar, low profile (i.e., thin), at least partially or substantially optically transparent and integrated into the glass roof 1.

Figure 2:
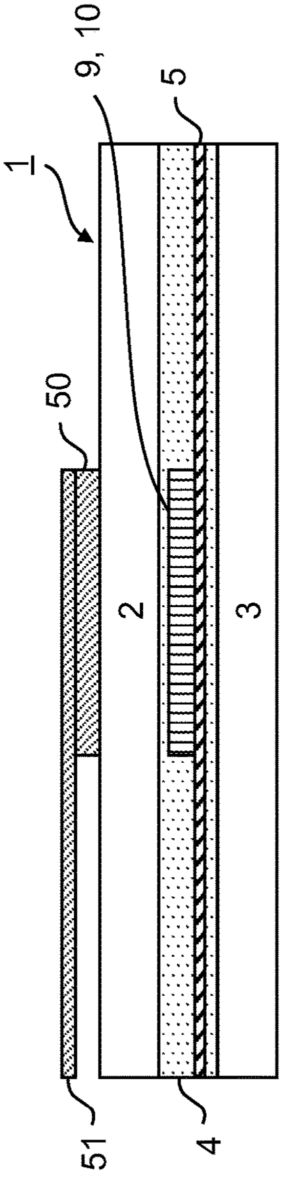
FIG. 2 shows a cross-sectional view of a portion of the glass roof comprising the antenna.
Figure 3:
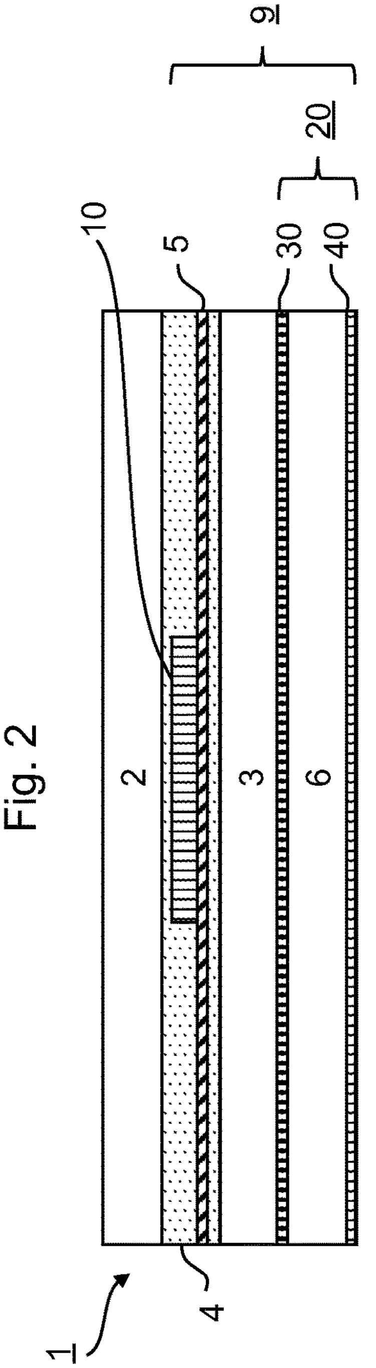
FIG. 3 shows an alternative example of the antenna of FIG. 2.
Figure 4:
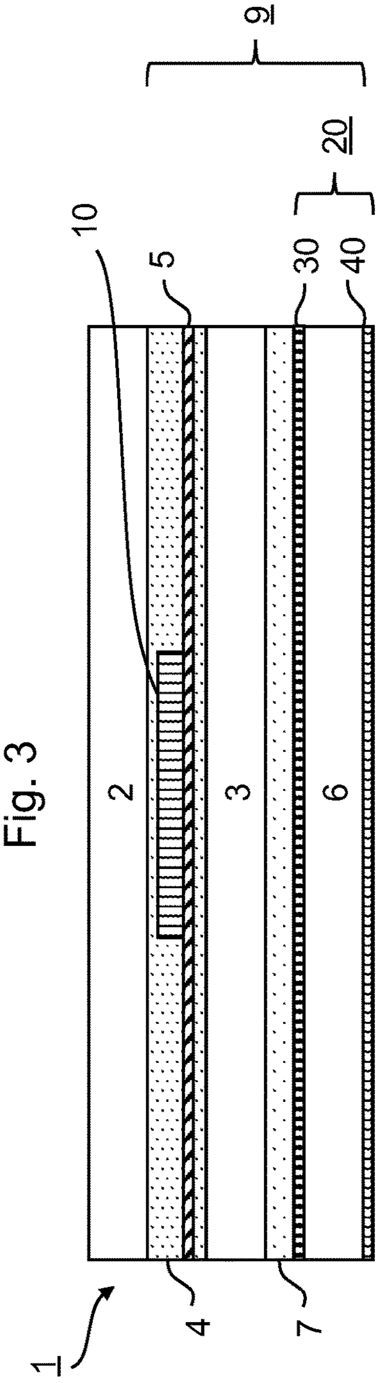
FIG. 4 shows a further alternative example of the antenna of FIG. 2.

Different examples of how the antenna 9 may be attached and/or embedded into the glass roof 1 are shown in FIGS. 2 to 4 and explained below with reference thereto. FIGS. 2 to 4 show cross sectional views along line X-X in FIG. 1.

FIG. 2 shows a first example of the glass roof 1, in which the antenna 9 comprises a radiator 10, in particular is made up only of the radiator 10. The glass roof 1 may utilize a laminated roof glass. The glass roof 1 comprises an exterior glass layer 2 and an interior glass layer 3 as well as an intermediate layer 4, which may be made from or comprise polyvinyl butyral (PVB), for example.

Figure 5:
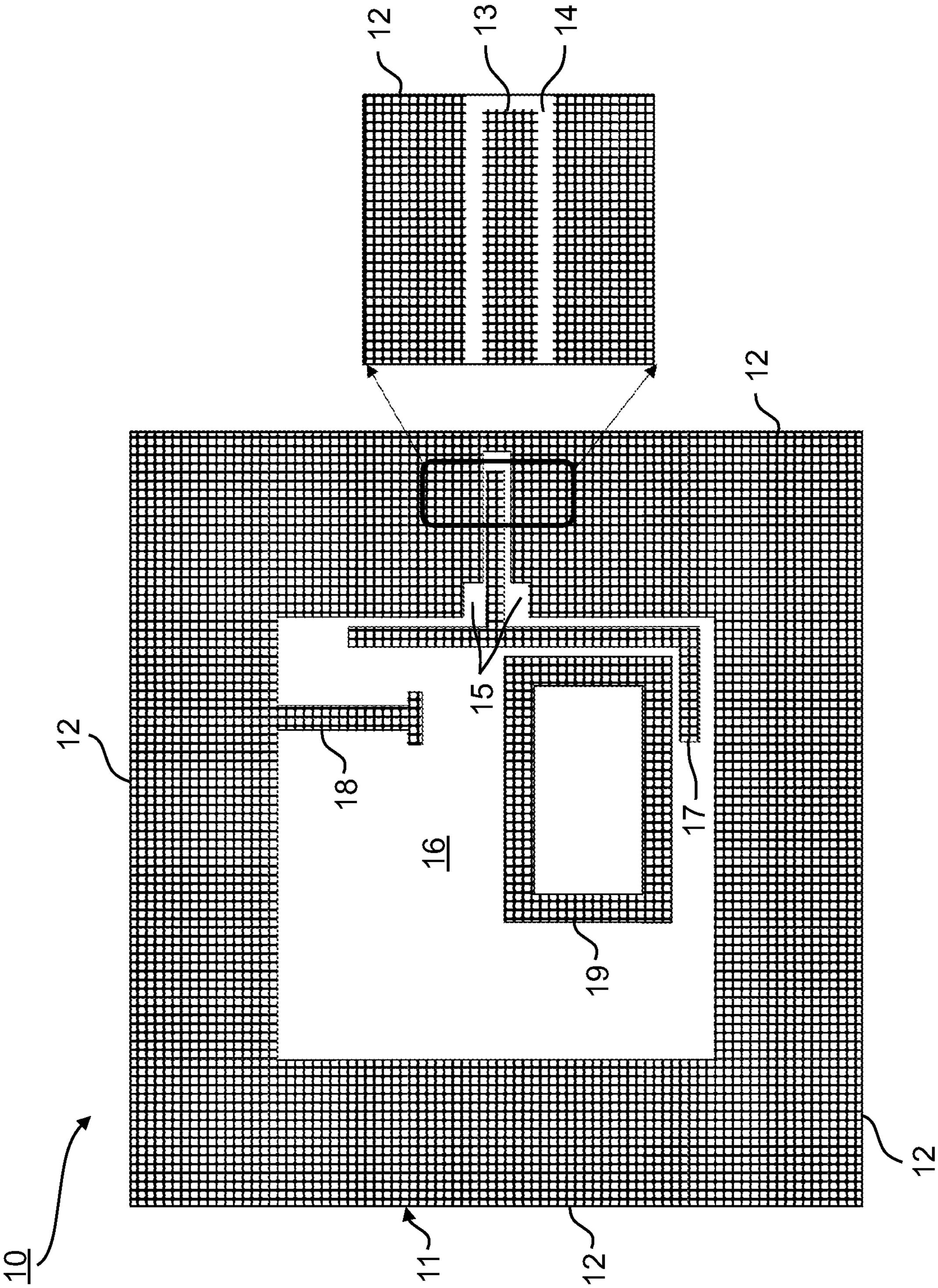
FIG. 5 shows a top view on a radiator of the antenna of FIG. 2.

As can be seen in FIG. 2, the radiator 20 of the antenna 9 is embedded in the laminated roof glass of the glass roof 1. The top view of the radiator 10 is shown in FIG. 5, consisting of a single conductive thin layer, in particular with no via hole for glass roof implementation. Therefore, this design is less conspicuous than traditional antennas or sticker antennas mounted on the vehicle body, and it is also protected from vandalism and other hazards. To have high overall optical transparency, a conductive mesh may be used for the radiator's conductive layer, which may be from metal or other conductive materials, for example.

By utilizing a thin mesh structure having a plurality of openings in the radiator 10 (see FIG. 5), light transmission through the openings is ensured, leading to enhanced overall optical transparency of the antenna 9. However, any other transparent conductor can also be used considering the compromise between conductivity and transparency.

For conductive mesh implementation of the radiator 10, one option is to mount the conductive mesh on another substrate layer 5 (e.g., polyethylene terephthalate (PET)), as shown in FIG. 2. The conductive mesh of the radiator 10 may be placed with its substrate layer 5, which may be at least partially or substantially optically transparent, in between the two glass layers 2, 3 and in between the intermediate layer 4 during manufacture. The roof glass of the glass roof 1 may accordingly be laminated together with the radiator 10 of the antenna 9.

In the example of FIG. 2, a compact electromagnetic connector 50 can be used for the feeding of the signal of the radiator 10 to the receiver 70. The capacitive-coupling based connector 50 serves as a transition stage, which may effectively transfer the signal from a coaxial cable to the wired connection 51, which may be an in-glass coplanar waveguide (CPW) line that feeds the radiator 10 (in transmitting mode) or vice versa (in receiving mode). As a further option, the in-glass CPW line can be extended to the edge region 8 of the glass roof 1, so that a coaxial cable connector could be attached directly to the CPW line.

The radiator 10 comprises a feed portion 13 (see FIG. 5), which may be a feedline, and is capacitively coupled to the electromagnetic connector 50. For this purpose, the electromagnetic connector 50 may be located opposite and parallel of the radiator 10, in particular the feed portion 13, as shown in FIG. 2. The electromagnetic connector 50 may further be placed, e.g., glued, onto the exterior side or interior side of the glass roof 1.

One drawback of the particular radiator 10 as explained herein is that it has bidirectional radiation (i.e., right-hand circularly polarization pattern upwards and left-hand circularly polarization pattern downwards), which causes low broadside gain. When placed in the glass roof 1 of the vehicle, the antenna 9 will thus radiate towards the vehicle cabin, making the performance of the antenna 9 dependent on the internal design of the vehicle. To minimize the backwards radiation and thus the sensitivity of the antenna input impedance and radiation characteristics to the internal design of the vehicle, the reflector 20 shown in the examples of FIGS. 3 and 4 is proposed, which may be used to yield unidirectional pattern, higher gain, and higher front-to-back ratio.

Typically, a relatively large antenna height (i.e., distance between the reflector 20 and the radiator 10) is required to achieve good performance for these antennas 9 with traditional solid metal reflectors (known as perfect electric conductor (PEC) reflectors). Therefore, to achieve a smaller profile, another type of reflector 20 known as artificial magnetic conductor (AMC) is suggested, comprising two reflection layers 30, 40, in particular metal layers, which may be configured to be adhered to the interior side of the glass roof 1, which can be in the form of an AMC substrate being glued to the glass roof, for example.

The reflector 20 is distanced from the radiator 10 at least by the thickness of the interior glass layer 3. In the example of FIG. 4, an additional layer 7 increases this distance between the reflector 20 and the radiator 10. The additional layer 7 may be from an at least partially or substantially optically transparent material or air, for example.

Figure 6:
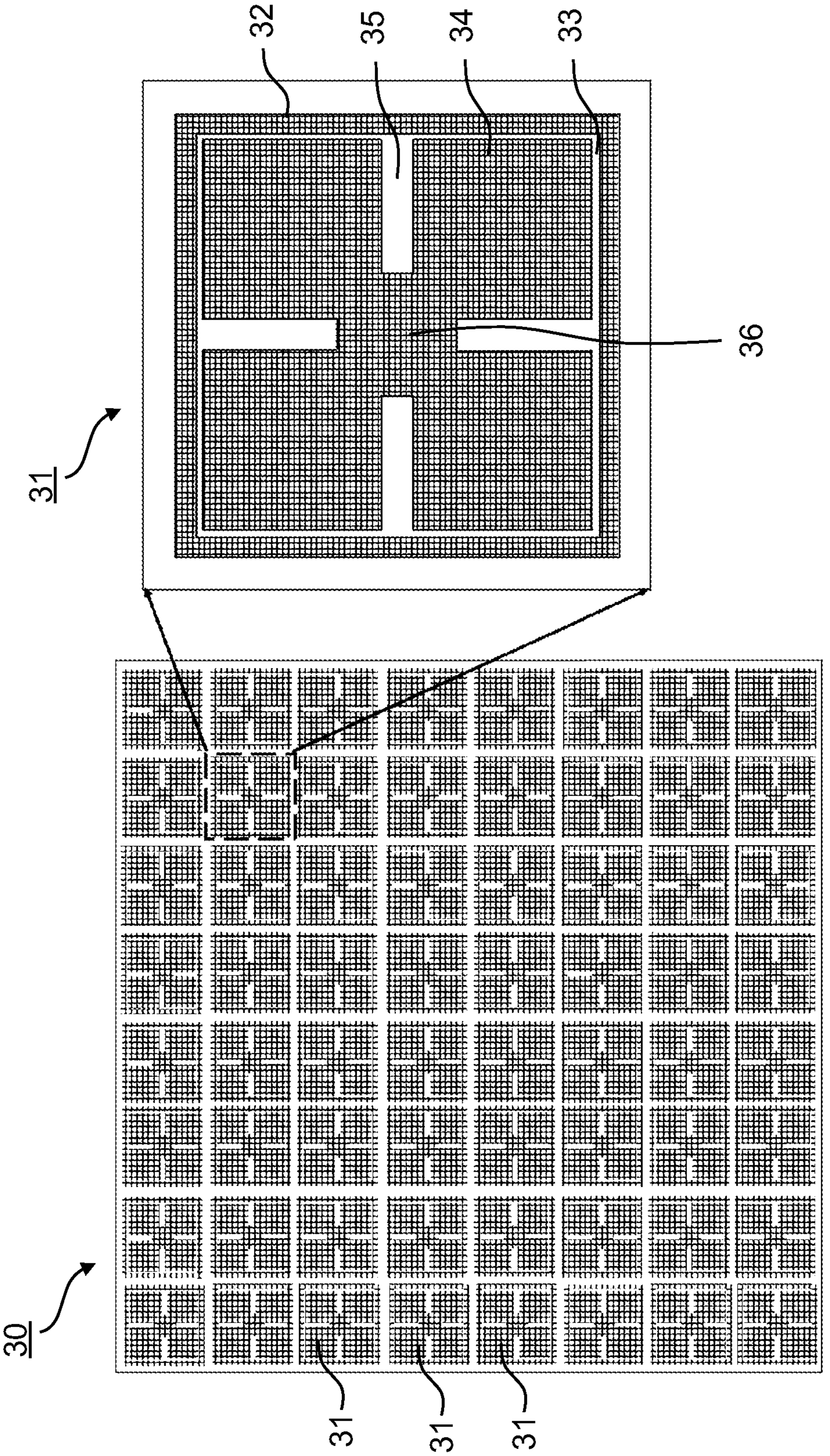
FIG. 6 shows a top view on a first reflector layer of a reflector of the antenna of FIG. 4 or 5.

The top or first reflector layer 30, which is closer to the radiator 10, may be a periodic conductor structure consisting of N by N similar unit cells, such as shown in FIG. 6. The bottom or second reflector layer 40 of the reflector 20 may be a ground plane. Similar to the radiator 10, both reflector layers 30, 40 may be constructed of conductive and at least partially or substantially transparent materials such as conductive mesh.

For the first reflector layer 30, advantage of an interior coating layer 6, which may be an electrochemical coating layer, of the glass roof 1 may be taken. The first reflector layer 30 may be sandwiched between the interior glass layer 3 and the interior coating layer 6 or included in the interior coating layer 6. To mitigate high mutual coupling between the radiator 10 and the reflector 20, which can result in ripples in the final radiation and impedance results, the additional layer 7, preferably with low permittivity (e.g., acrylic), is provided between the radiator 10 and reflector 20, as shown in FIG. 4. Moreover, the unit cells just below the radiator 10 can also be removed for decreasing the mutual coupling between the radiator 10 and the reflector 20 at the expense of smaller front-to-back ratio in the antenna pattern.

Both, a wide band and a multiband reflector may be used for the reflector 20, which can be implemented by different unit cell structures. Wide band unit cells could be an option as the frequency ratio of two frequency bands are small. However, to mitigate interference from the frequencies between the lower bands (i.e., L2&L5) and the higher band (i.e., L1), a multiband reflector is suitable. Accordingly, a multiband reflector may be provided as reflector 9. Since the L2 and L5 frequencies are close to each other, a dual-band reflector 9 with the L2 and L5 frequency bands covered within the same frequency band may be used.

The first reflector layer 30 may be an AMC reflector comprising or consisting of periodic metal unit-cells. The second reflector layer 40 may be a back ground plane. The first reflector layer 30 and/or the second reflector layer 40 may provide 0 degree of reflection phase for the normal incidence plane waves in the bands of interest. A dual band square loop geometry unit cell may be used, which provides 0 degree of phase shift (+90 degree of reflection phase) at lower bands (i.e., L2, L5) and higher band (i.e., L1).

In addition to isolating the antennas 10 from the inside, the reflector 20 helps to have a stable phase center within a wide beam and wide bandwidth, which is highly desirable for a GNSS or HP-GNSS antenna. Also, the reflector 20 helps with protecting the antenna system 100 from multipath propagation.

FIG. 5 shows an example of a design of a radiator 10. The radiator 10 has an outer segment 11 and an inner segment 16. The outer segment 11 is designed as a rectangular or square rim with four sides 12 or edges in this example. A feed portion 13 extends inside of one of the four sides 12, in particular in a slot 14 inside of one of the four sides 12 as may be seen by the detailed illustration of a part of the radiator 10 to the right of it. The feed portion 13 is designed as an I-shaped or strip-shaped structure.

The inner segment 16 is a space inside the outer segment 11, which is empty except for an asymmetrically shaped structure 17, a T-shaped structure 18 and a loop structure 19. The asymmetrically shaped structure 17 is designed as an L-shaped structure in this example and connected to the feed portion 13. Between the asymmetrically shaped-structure 17 and the feed portion 13, additional cut-outs 15 or width-increased slots are provided for at least a certain length of the feed portion 13 inside of the outer segment and between the asymmetrically shaped-structure 17 and the feed portion 13. The T-shaped structure 17 extends from a side 12 neighboring the side 12 having the slot 14. The L-shaped structure and the loop structure 19 extend in parallel to the side 12 opposite of the side 12 having the T-shaped structure 18 attached thereto.

Figure 7:
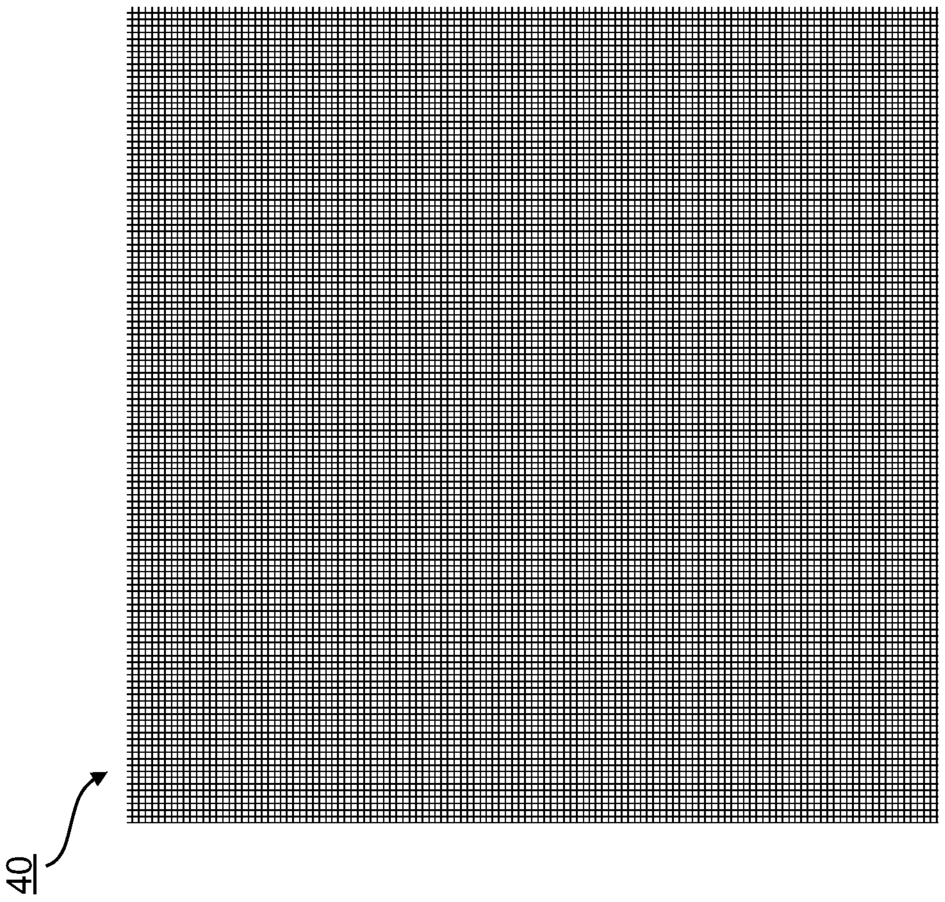
FIG. 7 shows a top view on a second reflector layer of the reflector of the antenna of FIG. 4 or 5.

As seen in FIG. 6, the proposed unit cells of the first reflector layer 30 are rectangular structures 31 comprising an outer rectangular segment 32, in particular an outer square ring or outer square rim, and an inner square patch with four rectangular slots 35 and four interconnected sub-rectangular structures 34 divided by the four slots 35, each one of the slots 35 being aligned in a 90° angle with respect to a neighboring slot 35. The inner square patch is separated from the outer rectangular segment 32 by means of a gap 33, in particular a rectangular or square gap 33. The sub-rectangular structures 34 are interconnected in their center structure 36 with each other. If the number of unit cells or rectangular structures 31 increases, the antenna's radiation pattern will be improved accordingly. However, a smaller reflector size can cause edge effect in the radiation, further resulting in lower front-to-back ratio and worse impedance matching. FIG. 7 shows the second reflector layer 40 designed as a ground plate.

The advantages of the antenna include low design complexity (flat design, low profile, transparent, simple structure with only one feeding port, no matching circuit nor divider/coupler) and potential for significant cost reductions (part price, development cost, transport cost, no license cost). It will also provide more flexibility in the mounting of the antenna compared to the current available solutions. The antenna 9 has considerably less weight than traditional HP-GNSS antennas, reducing the climate impact. There is also potential for more ergonomic mounting in the factory, by having the antenna 9 implemented inside the glass before shipment to the factory.

Other variations to the disclosed examples can be understood and effected by those skilled in the art in practicing the claimed disclosure, from the study of the drawings, the disclosure, and the appended claims. In the claims the word "comprising" or "having" does not exclude other elements or steps and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope of the claims.

LIST OF REFERENCE SIGNS

1 glass roof
2 exterior glass layer
3 interior glass layer
4 intermediate layer
5 substrate layer
6 interior coating layer
7 additional layer
8 edge region
9 antenna
10 radiator
11 outer segment
12 side
13 feed portion
14 slot
15 cut-out
16 inner segment
17 asymmetrically shaped structure
18 T-shaped structure
19 loop structure
20 reflector

30 first reflector layer
31 rectangular structure
32 outer rectangular segment
33 gap
34 sub-rectangular structure
35 slot
36 center structure
40 second reflector layer
50 electromagnetic connector
51 wired connection
60 amplifier
70 receiver
100 antenna system

What is claimed is:

1. An antenna for embedded in a glass roof of a vehicle, wherein the antenna is substantially flat and is configured as a global navigation satellite system (GNSS) antenna, and wherein the antenna comprises:

a radiator for radiating electromagnetic waves, wherein the radiator is:

disposed between two glass layers of the glass roof, configured for feeding a signal to a receiver, and configured for radiating the electromagnetic waves in at least three frequency bands of GNSS; and a reflector for reflecting the electromagnetic waves from the radiator, wherein the reflector is provided at a first defined distance from the radiator, wherein the first defined distance corresponds to at least a thickness of an interior glass layer of the two glass layers disposed between the radiator and the reflector, and wherein the reflector comprises a first reflector layer and a second reflector layer arranged substantially in parallel and separated by a second defined distance.

2. The antenna according to claim 1, wherein the antenna is further configured as a high-precision global navigation satellite system (HP-GNSS) antenna.

3. The antenna according to claim 1, wherein the radiator is configured for electromagnetic coupling or for physical connection at an edge region of the glass roof.

4. The antenna according to claim 1, wherein the radiator comprises an outer segment, wherein the outer segment comprises a feed portion configured for feeding the signal to the receiver, or wherein the radiator comprises an inner segment, wherein the inner segment comprises at least one of a T-shaped structure, an asymmetric structure, or a loop structure.

5. The antenna according to claim 1, wherein the first defined distance between the radiator and the reflector is based further on an additional layer in between the radiator and the reflector, and wherein the additional layer comprises at least one of air or a low permittivity substrate.

6. The antenna according to claim 1, wherein the reflector is provided in or at an interior coating layer of the glass roof.

7. The antenna according to claim 1, wherein the first reflector layer is configured as a periodic structure.

8. The antenna according to claim 1, wherein the second reflector layer is configured as a ground plate.

9. The antenna according to claim 1, wherein the reflector comprises periodically repeated rectangular structures, and wherein each rectangular structure of the rectangular structures comprises slots dividing the rectangular structure into four interconnected sub-rectangular structures inside of each rectangular structure.

10. The antenna according to claim 1, wherein at least one of the radiator or the reflector is at least partially optically transparent.

11. The antenna according to claim 1, wherein at least one of the radiator or the reflector comprises a conductive thin film or a conductive mesh.

12. The antenna according to claim 1, wherein at least one of the radiator or the reflector is provided on a substrate layer.

13. An antenna system, comprising:

an antenna embedded in a glass roof of a vehicle, wherein the antenna is substantially flat and is configured as a global navigation satellite system (GNSS) antenna, and wherein the antenna comprises:

a radiator for radiating electromagnetic waves, wherein the radiator is:

disposed between two glass layers of the glass roof, configured for feeding a signal to a receiver, and configured for radiating the electromagnetic waves in at least three frequency bands of GNSS; and a reflector for reflecting the electromagnetic waves from the radiator, wherein the reflector is provided at a first defined distance from the radiator, wherein the first defined distance corresponds to at least a thickness of an interior glass layer of the two glass layers disposed between the radiator and the reflector, and wherein the reflector comprises a first reflector layer and a second reflector layer arranged substantially in parallel and separated by a second defined distance.

14. The antenna system of claim 13, wherein the antenna is further configured as a high-precision global navigation satellite system (HP-GNSS) antenna.

15. The antenna system of claim 13, wherein the radiator is configured for electromagnetic coupling or for physical connection at an edge region of the glass roof.

16. The antenna system of claim 13, wherein the radiator comprises an outer segment, wherein the outer segment comprises a feed portion configured for feeding the signal to the receiver, or wherein the radiator comprises an inner segment, wherein the inner segment comprises at least one of a T-shaped structure, an asymmetric structure, or a loop structure.

17. The antenna system of claim 13, wherein the first reflector layer is configured as a periodic structure, and wherein the second reflector layer is configured as a ground plate.

18. A glass roof of a vehicle, comprising:

an antenna embedded within the glass roof of the vehicle, wherein the antenna is substantially flat and is configured as a global navigation satellite system (GNSS) antenna, and wherein the antenna comprises:

a radiator for radiating electromagnetic waves, wherein the radiator is:

disposed between two glass layers of the glass roof, configured for feeding a signal to a receiver, and configured for radiating the electromagnetic waves in at least three frequency bands of GNSS; and a reflector for reflecting the electromagnetic waves from the radiator, wherein the reflector is provided at a first defined distance from the radiator, wherein the first defined distance corresponds to at least a thickness of an interior glass layer of the two glass layers disposed between the radiator and the reflector, and wherein the reflector comprises a first reflector layer and a second reflector layer arranged substantially in parallel and separated by a second defined distance.

19. The glass roof of claim 18, wherein the antenna is further configured as a high-precision global navigation satellite system (HP-GNSS) antenna.

20. The glass roof of claim 18, wherein the first reflector layer is configured as a periodic structure, and wherein the second reflector layer is configured as a ground plate.

* * * * *